United States Patent
Kuo

(10) Patent No.: US 7,922,472 B2
(45) Date of Patent: Apr. 12, 2011

(54) MOLD FOR USE IN INJECTION MOLDING PROCESS

(75) Inventor: Yuan-Lung Kuo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 13 days.

(21) Appl. No.: 12/576,332

(22) Filed: Oct. 9, 2009

(65) Prior Publication Data

US 2010/0178378 A1    Jul. 15, 2010

(30) Foreign Application Priority Data

Jan. 12, 2009 (CN) .......................... 2009 1 0300143

(51) Int. Cl.
*B29C 33/30* (2006.01)

(52) U.S. Cl. .................. 425/190; 425/192 R; 425/572; 425/588

(58) Field of Classification Search .................. 425/185, 425/186, 190, 192 R, 572, 588
See application file for complete search history.

(56) References Cited

U.S. PATENT DOCUMENTS

| 4,202,522 | A | * | 5/1980 | Hanas et al. | 249/102 |
| 4,551,084 | A | * | 11/1985 | Lake | 425/185 |
| 4,867,666 | A | * | 9/1989 | Brizio et al. | 425/190 |
| 4,959,002 | A | * | 9/1990 | Pleasant | 425/192 R |
| 7,458,797 | B2 | * | 12/2008 | Tsai | 425/192 R |
| 7,462,027 | B2 | * | 12/2008 | Chien | 425/192 R |
| 7,497,677 | B1 | * | 3/2009 | Crian et al. | 425/185 |
| 2009/0324767 | A1 | * | 12/2009 | Kloeppel et al. | 425/190 |

* cited by examiner

*Primary Examiner* — Tim Heitbrink
(74) *Attorney, Agent, or Firm* — Raymond J. Chew

(57) ABSTRACT

A mold for use in an injection molding process includes a molding plate, a molding block and a plurality of mold cores. The molding plate defines a receiving cavity, a plurality of through holes and a plurality of elongate gates. The through holes surround the receiving cavity, and each of the elongate gates communicates with the receiving cavity and the corresponding through hole. The molding block is detectably received in the receiving cavity. The molding block defines a cold slug well and a plurality of runners. Each runner communicates with the cold slug well and the corresponding elongate gate. Each mold core is received in the corresponding through hole.

19 Claims, 4 Drawing Sheets

MOLD FOR USE IN INJECTION MOLDING PROCESS

BACKGROUND

1. Technical Field

The present disclosure relates to a mold for use in an injection molding process.

2. Description of Related Art

Generally, in an injection molding process, a mold is used. The mold defines a plurality of mold cavities to form a plurality of plastic articles. For different requirements, molds with mold cavities of different number are provided. However, for desired mold cavities, one mold has to be replaced by other mold with the desired mold cavities for use in the molding process. This increases manufacturing cost of the plastic articles.

Therefore, a mold for use in an injection molding process, which can overcome the above mentioned problems is desired.

DETAILED DESCRIPTION

Figure 1:
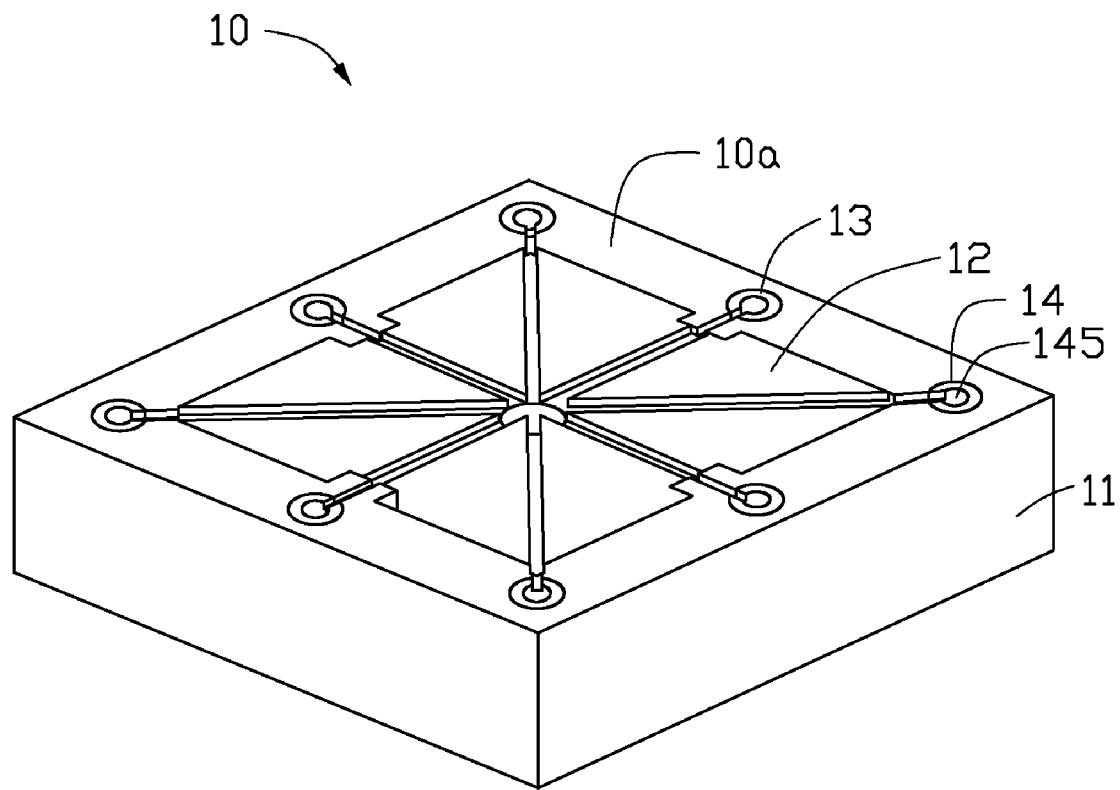
FIG. 1 is a schematic and isometric view of a mold, according to a first exemplary embodiment.
Figure 2:
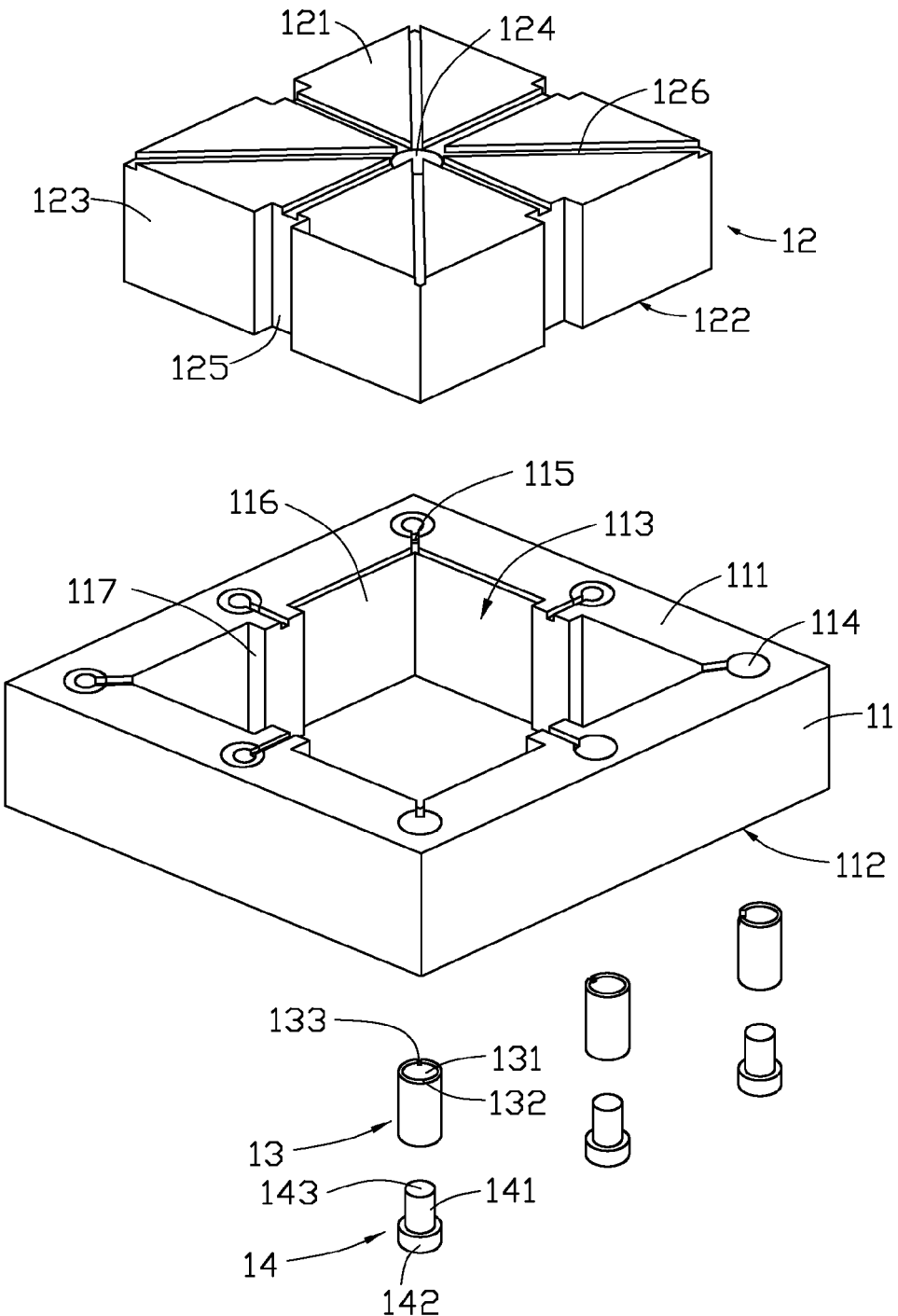
FIG. 2 is an exploded view of the mold of FIG. 1.

Referring to FIGS. 1 and 2, a mold 10 for use in an injection molding process, according to a first exemplary embodiment, includes a molding plate 11, a molding block 12, a plurality of sleeves 13, and a plurality of mold cores 14.

The molding plate 11 is substantially cuboid-shaped and includes a first surface 111 and a second surface 112 opposite to the first surface 111. A receiving cavity 113 is defined from the first surface 111 to the second surface 112 at a central portion of the molding plate 11. Thus, four inner surfaces 116 of the molding plate 11 are formed and cooperatively bound the receiving cavity 113. A plurality of through holes 114 are defined from the first surface 111 to the second surface 112 at an edge portion of the molding plate 11. The through holes 114 surround the receiving cavity 113. A plurality of elongate gates 115 are defined in the first surface 111. Each elongate gate 115 communicates with the corresponding through hole 114 and the receiving cavity 113.

Four first guiding portions 117 are formed in the receiving cavity 113. Each first guiding portion 117 is formed on the corresponding inner surface 116. In this embodiment, the first guiding portion 117 is an elongate protrusion and positioned at a central portion of the corresponding inner surface 116.

The molding block 12 is substantially cuboid-shaped and has a thickness same as that of the molding plate 11. The molding block 12 includes a third surface 121, a fourth surface 122 and four side surfaces 123 perpendicularly connecting the third surface 121 and the fourth surface 122. The molding block 12 is shaped and sized to match the receiving cavity 113. When the molding block 12 is assembled to the molding plate 11, the third surface 121 and the first surface 111 are coplanar and cooperatively form a parting surface 10a (see FIG. 1). A cold slug well 124 is defined in a central portion of the third surface 121.

The molding block 12 further includes a plurality of runners 126 defined in the third surface 121. The runners 126 radially extend from the cold slug well 124 to the side surfaces 123. When the molding block 12 is assembled to the molding plate 11, each runner 126 is aligned with a corresponding elongate gate 115 and communicates with the cold slug well 124 and the corresponding elongate gate 115.

Four second guiding portions 125 are formed on the four side surfaces 123, respectively. In this embodiment, the second guiding portion 125 is an elongate groove defined in the side surface 123, corresponding to the first guiding portion 117. The second guiding portion 125 is shaped and sized to match the first guiding portion 117. When the molding block 12 is assembled to the molding plate 11, the second guiding portion 125 is engaged with the first guiding portion 117 and the molding block 12 is guided by engagement between the first guiding portion 117 and the second guiding portion 125. As a result, the runners 126 are well aligned with the elongate gates 115.

Each sleeve 13 is a hollow cylinder. A receiving through hole 131 is defined through the sleeve 13 along a central axis of the sleeve 13. A cutout 133 is defined in a top end surface 132 of the sleeve 13 and communicates with the receiving through hole 131. When the sleeve 13 is assembled to the molding plate 11, the sleeve 13 is received in the through hole 114. The end surface 132 of the sleeve 13 is coplanar with the first surface 111 of the molding plate 11 with the cutout 133 aligned with the elongate gate 115.

Each mold core 14 includes a head portion 142 and a cylindrical body 141 extending from the head portion 142. The head portion 142 is disc-shaped. A diameter of the head portion 142 is same as an outer diameter of the sleeve 13 and a diameter of the cylindrical body 141 is slightly smaller than that of the receiving through hole 131 so that the cylindrical body 141 is fixedly received in the receiving through hole 131 with the head portion 142 of the mold core 14 out of the sleeve 13. The thickness of the head portion 142 plus the height of the sleeve 13 is approximately same as the thickness of the molding plate 11 so that the sleeve 13 and the mold core 14 can be totally received in the through hole 114.

A distal end surface 143 of the cylindrical body 141 is a molding surface 143. The molding surface 143 is a concave surface in this embodiment. The molding surface 143 and the sleeve 13 cooperatively define a mold cavity 145 (see FIG. 1). Therefore, one advantage of the sleeve 13 is that size of the mold cavity 145 can be adjusted using the sleeve 13. Molten molding material flows into the mold cavity 145 through the runner 126, the elongate gate 115 and the cutout 133. It can be understood that in other alternative embodiment, the molding surface 143 may be a convex surface.

When in use, the mold 10 may be used as a female mold. A male mold (not shown) with a sprue may be assembled on the parting surface 10a of the mold 10. The sprue is aligned with the cold slug well 124 and the molten molding material is injected from the sprue. Then the molten molding material flows to the molding cavity 145 through the runner 126, the elongate gate 115 and the cutout 133.

Figure 3:
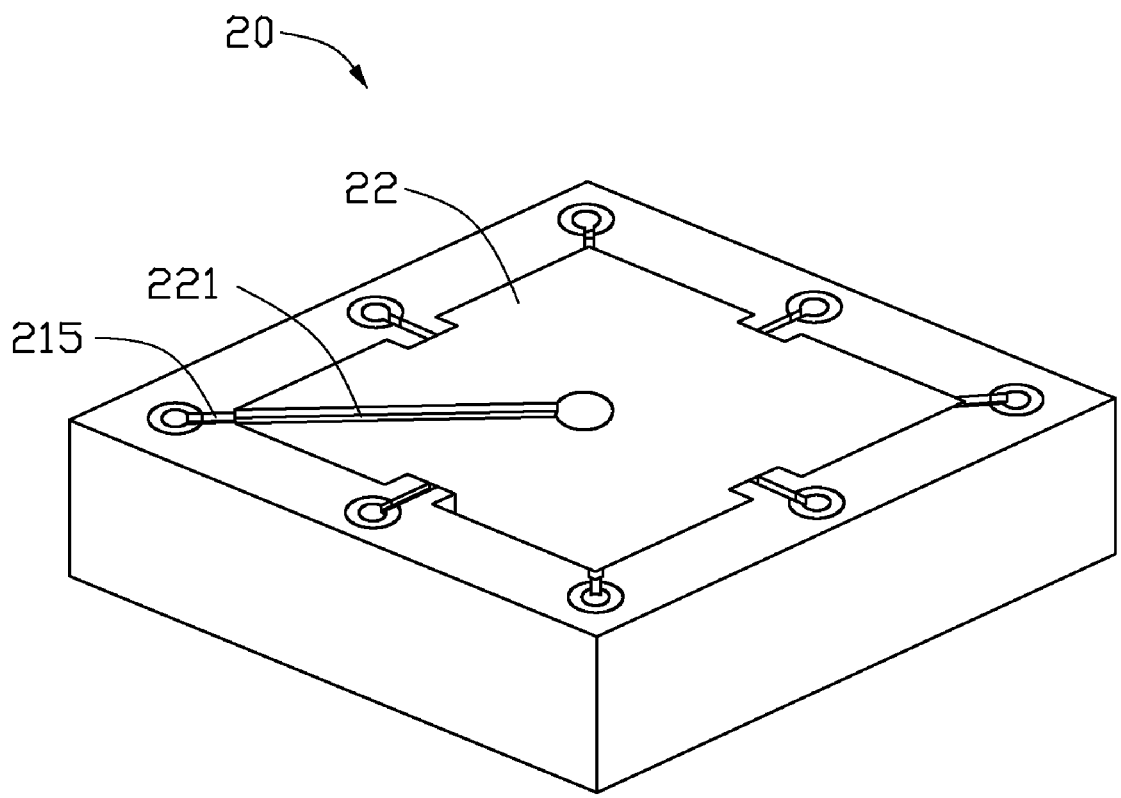
FIG. 3 is a schematic and isometric view of a mold, according to a second exemplary embodiment.

Referring to FIG. 3, a mold 20, according to a second exemplary embodiment, is shown. Difference between the mold 20 of this embodiment and the mold 10 of the first embodiment is that the molding block 22 of the mold 20 differs. In this embodiment, the molding block 22 includes a runner 221. The runner 221 is aligned with an elongate gate 215.

It can be understood that in other alternative embodiments, the molding block 22 may include two runners, three runners etc., depending upon a practical use. The first guiding portion 117 can be an elongate groove. The second guiding portion 125 can be an elongate protrusion.

Since the molding block with the runners can be detachably mounted in the mold, it is easy to replace molding blocks with runners of different number. Therefore, the mold cavity communicating with the corresponding runner is used for molding plastic articles. A mold replacement can be avoided. This reduces the manufacturing cost of the plastic articles.

Figure 4:
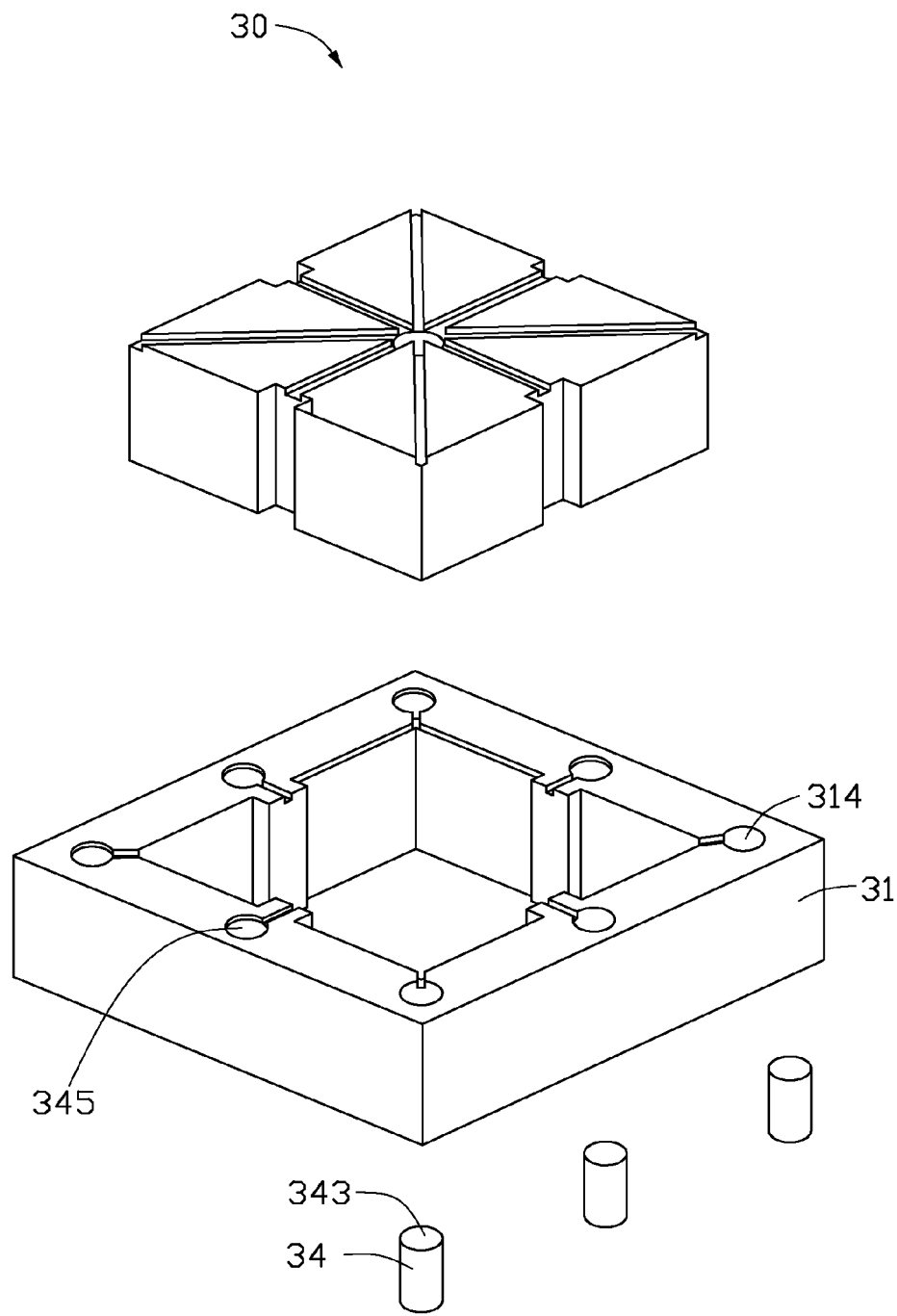
FIG. 4 is an exploded view of a mold, according to a third exemplary embodiment.

Referring to FIG. 4, a mold 30, according to a third exemplary embodiment, is shown. Differences between the mold 30 of this embodiment and the mold 10 of the first embodiment are that the sleeves are omitted and the mold cores 34 of the mold 30 differ.

Each mold core 34 is substantially cylindrical. A top surface 343 of the mold core 34 is the molding surface 343 and is a concave surface. A height of the mold core 34 is smaller than the depth of the through hole 314 and a diameter of the mold core 34 is slightly smaller than that of the through hole 314. Thus, the top surface 343 and an inner surface bounding the through hole 114 of the molding plate 31 cooperatively define a mold cavity 345.

Advantages of the mold 30 are similar to those of the mold 10.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mold for use in an injection molding process, comprising:
   a molding plate defining a receiving cavity, a plurality of through holes and a plurality of elongate gates, the through holes surrounding the receiving cavity, each of the elongate gates communicating with the receiving cavity and the corresponding through hole;
   a molding block detectably received in the receiving cavity, the molding block defining a cold slug well and a plurality of runners, each of the runners communicating with the cold slug well and the corresponding elongate gate; and
   a plurality of mold cores each received in a corresponding through hole.

2. The mold of claim 1, wherein the molding plate is substantially cuboid-shaped.

3. The mold of claim 2, wherein the molding plate comprises a first surface and a second surface opposite to the first surface, the receiving cavity extending from the first surface to the second surface at a central portion of the molding plate.

4. The mold of claim 3, wherein the molding plate comprises a plurality of inner surfaces, the inner surfaces bounding the receiving cavity.

5. The mold of claim 4, wherein the molding plate comprises a plurality of first guiding portions formed in the receiving cavity, each first guiding portion formed on the corresponding inner surface.

6. The mold of claim 5, wherein the molding block is substantially cuboid-shaped.

7. The mold of claim 6, wherein the molding block comprises a third surface, a fourth surface and four side surfaces perpendicularly connecting the third surface and the fourth surface, and the runners are defined in the third surface.

8. The mold of claim 7, wherein the molding block comprises a plurality of second guiding portions formed on the four side surfaces, respectively, and the second guiding portions correspond to the respective first guiding portions.

9. The mold of claim 8, wherein the second guiding portion is an elongate groove defined in the side surface and the first guiding portion is an elongate protrusion formed on the inner surface.

10. The mold of claim 8, wherein the first guiding portion is an elongate groove defined in the inner surface and the second guiding portion is an elongate protrusion formed on the side surface.

11. The mold of claim 1, further comprising a plurality of sleeves, each of the mold cores received in the corresponding sleeve, the sleeve defining a cutout corresponding to the elongate gate.

12. A mold for use in an injection molding process, comprising:
   a molding plate defining a receiving cavity, a plurality of through holes and a plurality of elongate gates, the through holes surrounding the receiving cavity, each of the elongate gates communicating with the receiving cavity and the corresponding through hole;
   a molding block detectably received in the receiving cavity, the molding block defining a cold slug well and a runner, the runner communicating with the cold slug well and one of the elongate gates; and
   a plurality of mold cores each received in a corresponding through hole.

13. The mold of claim 12, wherein the molding plate is substantially cuboid-shaped.

14. The mold of claim 13, wherein the molding plate comprises a first surface and a second surface opposite to the first surface, the receiving cavity extending from the first surface to the second surface at a central portion of the molding plate.

15. The mold of claim 14, wherein the molding plate comprises a plurality of inner surfaces, the inner surfaces bounding the receiving cavity.

16. The mold of claim 15, wherein the molding plate comprises a plurality of first guiding portions formed in the receiving cavity, each first guiding portion formed on the corresponding inner surface.

17. The mold of claim 16, wherein the molding block is substantially cuboid-shaped.

18. The mold of claim 17, wherein the molding block comprises a third surface, a fourth surface and four side surfaces perpendicularly connecting the third surface and the fourth surface, and the runner is defined in the third surface.

19. The mold of claim 18, wherein the molding block comprises a plurality of second guiding portions formed on the four side surfaces, respectively, and the second guiding portions correspond to the respective first guiding portions.

* * * * *